United States Patent [19]

Günther et al.

[11] Patent Number: 5,782,088
[45] Date of Patent: Jul. 21, 1998

[54] PISTON-TYPE INTERNAL COMBUSTION ENGINE HAVING TWO GROUPS OF CYLINDERS ONE OF WHICH BEING SELECTIVELY INOPERATIVE AND MEANS FOR SUPPLYING EXHAUST GAS TO THE CATALYTIC CONVERTER OF THE INOPERATIVE GROUP

[75] Inventors: Josef Günther, Affalterbach; Roland Kemmler, Stuttgart; Herbert Klein, Leutenbach; Uwe Kleinecke, Winnenden; Wolfgang Oehler, Suttgart, all of Germany

[73] Assignee: Mercedes Benz AG, Stuffgart, Germany

[21] Appl. No.: 813,408

[22] Filed: Mar. 10, 1997

[30] Foreign Application Priority Data

Mar. 22, 1996 [DE] Germany .................. 196 11 363.6

[51] Int. Cl.⁶ ............................................. F02M 25/06
[52] U.S. Cl. ............................. 60/278; 60/300; 60/302
[58] Field of Search ........................ 60/278, 300, 302

[56] References Cited

U.S. PATENT DOCUMENTS 5,384,098  1/1995  Morikawa .................. 60/287
5,647,207  7/1997  Grotjahn et al. ........... 60/300

FOREIGN PATENT DOCUMENTS 0 688 941  12/1995  European Pat. Off. .
29 07 934   9/1980  Germany .
44 21 258  12/1995  Germany .
2 106 178   4/1983  United Kingdom .

Primary Examiner—Thomas E. Denion
Attorney, Agent, or Firm—Klaus J. Bach

[57] ABSTRACT

In an internal combustion engine with at least two groups of cylinders of which each has an exhaust pipe with a catalytic converter and of which one group can be shut down so that it is inoperative during part-load engine operation, the exhaust pipes are joined downstream of the catalytic converters by a common pipe section, and vacuum generating means are provided for subjecting the exhaust pipe of the inoperative cylinder group upstream of its catalytic converter during part load operation when the one cylinder group is shut down to vacuum for pulling exhaust gas from the common pipe section into the catalytic converter of the inoperative cylinder group.

6 Claims, 2 Drawing Sheets

PISTON-TYPE INTERNAL COMBUSTION ENGINE HAVING TWO GROUPS OF CYLINDERS ONE OF WHICH BEING SELECTIVELY INOPERATIVE AND MEANS FOR SUPPLYING EXHAUST GAS TO THE CATALYTIC CONVERTER OF THE INOPERATIVE GROUP

BACKGROUND OF THE INVENTION

The invention relates to a multi-cylinder piston-type internal combustion engine with at least two cylinder groups, one of which can be shut down during part-load operation of the internal combustion engine, wherein different catalytic converters are provided in the engine exhaust system for the two groups of cylinders.

Such an internal combustion engine is known, for example, from DE 29 07 934 A1. The internal combustion engine disclosed therein comprises two cylinder groups, wherein one cylinder group is always operating whereas the other cylinder group can be shut down during part-load operation. The exhaust gases of the two cylinder groups are carried away by respective exhaust lines. Downstream of the catalytic converter of the continuously operating cylinder group, the exhaust pipes are joined in a common pipe section in which a second catalytic converter is provided. In part-load operation, the shut-down cylinder group acts as a pump and pumps air into the second catalytic converter. Then, however, the temperature of the second catalytic converter may fall below its operating temperature because of excessive cooling. As a result, the exhaust gas may be cleaned only to an insufficient degree or not at all. After a cold start of the internal combustion engine, the catalytic converter may not at all reach the operating temperature and the exhaust gases may be discharged to the environment without adequate catalytic cleaning.

DE 44 21 258 A1 furthermore discloses an internal combustion engine with two cylinder groups, one of which can be shut down, the cylinder groups having separate exhaust pipes upstream of a catalytic exhaust-gas cleaning device. When one cylinder group is shut down by cutting off the fuel supply while maintaining the intake and exhaust cycle, the exhaust gases of this cylinder group are supplied to the combustion chambers of the cylinder group which continues to operate or, in an alternative configuration of an internal combustion engine, are returned into the combustion chambers from which they originate. This prevents a situation where the exhaust gases of the inoperative and hence cooling cylinder group enter the catalytic exhaust-gas cleaning device and reduce its operating temperature. In the case of this known internal combustion engine, the exhaust-gas pipes of both cylinder groups can be joined by way of a pipe section, a catalytic converter being arranged in each of the exhaust pipes upstream of the junction. Since the exhaust pipe of a shut-down cylinder group is shut off upstream of the catalytic converter and the exhaust gases of this cylinder group are discharged by a different route, the catalytic converter is reliably protected from the cooling action of the cold exhaust gases. However, it is not possible, to prevent the catalytic converter of the shut-down cylinder group from cooling down and rapidly becoming inoperative if the part-load operation last for more than a relatively short time. When the shutdown cylinder group is then taken back into operation, the excessively cooled and inoperative catalytic converter may result in high exhaust emissions.

It is the object of the invention to provide a multi-cylinder piston-type internal combustion engine with a group of cylinders which can be rendered inoperative during part-load operation wherein the catalytic converter of the cylinder group which is shut down during part-load operation is brought to operating temperature in a very short time and is maintained during part-load operation at operating temperature without additional sources of heat.

SUMMARY OF THE INVENTION

In an internal combustion engine with at least two groups of cylinders of which each has an exhaust pipe with a catalytic converter and of which one group can be shut down so that it is inoperative during part-load engine operation, the exhaust pipes are joined downstream of the catalytic converters by a common pipe section, and vacuum generating means are provided for subjecting the exhaust pipe of the inoperative cylinder group upstream of its catalytic converter during part load operation when the one cylinder group is shut down to vacuum for pulling exhaust gas from the common pipe section into the catalytic converter of the inoperative cylinder group In part-load operation, the exhaust gas of the operative cylinder group flows through the first catalytic converter arranged in the associated exhaust pipe. The common pipe section is provided downstream of the catalytic converter. By virtue of the vacuum in the upstream pipe section of the inoperative cylinder group, some of the already cleaned exhaust gas is carried back through the second catalytic converter of the shut-down cylinder group. In the process, the hot exhaust gas heats the second catalytic converter of the inoperative cylinder group and brings it to operating temperature, whereby the exhaust gas may also be subjected to a second catalytic cleaning action. In any case, the second catalytic converter is heated and is at operating temperature when the second cylinder group is re-activated and exhaust gas is produced after the engine has gone through the part-load range. As a result the exhaust gas supplied by the newly activated cylinder group is immediately cleaned in the preheated second catalytic converter.

As a vacuum device by means of which a vacuum is produced in the exhaust pipe of the inoperative cylinder group, the cylinder group itself is preferably utilized, its pistons, which are moved by the crank shaft, developing a pumping action. The combustion chambers of the cylinders of the inoperative cylinder group are placed in communication with the exhaust pipe, so that a vacuum produced in the combustion chambers also acts on the exhaust pipe between the inoperative cylinder group and the catalytic converter whereby exhaust gas is sucked out of the exhaust pipe of the operative cylinder group. In order to use the sucking action of the inoperative cylinder group and to prevent ambient air from being drawn into the exhaust pipe of the inoperative cylinder group, the exhaust valves of the inoperative cylinder group are moved to their open positions and the inlet valves to their closed positions. Depending on the direction of the movement of the piston, a vacuum and an overpressure are alternately produced in the exhaust pipe of the inoperative cylinder group, resulting in an oscillating motion of the gas. When a vacuum is produced, the exhaust gas is drawn out of the common pipe section connecting the two exhaust pipes in the direction of the inoperative cylinder group and then pumped back again during the following stroke. This provides, in the region of the catalytic converter of the inoperative cylinder group, for an oscillating motion of the exhaust gas, whereby hot exhaust gas is pumped continuously through this catalytic converter in both directions.

In another embodiment, the vacuum device comprises an exhaust-gas recirculation conduit which connects the exhaust pipe of the inoperative cylinder group to the intake pipe of the operative cylinder group. By way of the intake pipe of the operative cylinder group, a vacuum is produced continuously in the pipe section of the inoperative cylinder group and, as described above, hot exhaust gas is pumped out of the exhaust pipe of the operating cylinder group and through the catalytic converter of the inoperative cylinder group. To control the so recirculated exhaust gas stream, a shut-off valve can be arranged in the exhaust-gas recirculation conduit.

Various features of the invention and advantageous embodiments will become apparent from the following description of the invention on the basis of the accompanying drawings:

DESCRIPTION OF THE DRAWINGS

Figure 1:
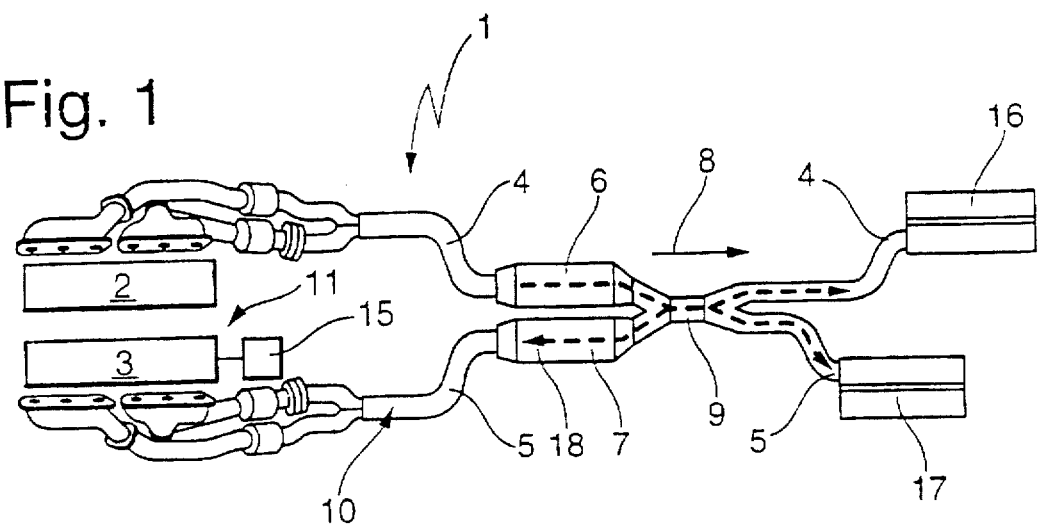
FIG. 1 is a schematic representation of an internal combustion engine operating in a part-load range wherein one group of cylinders is used as a pump by actuation of a vacuum device.
Figure 2:
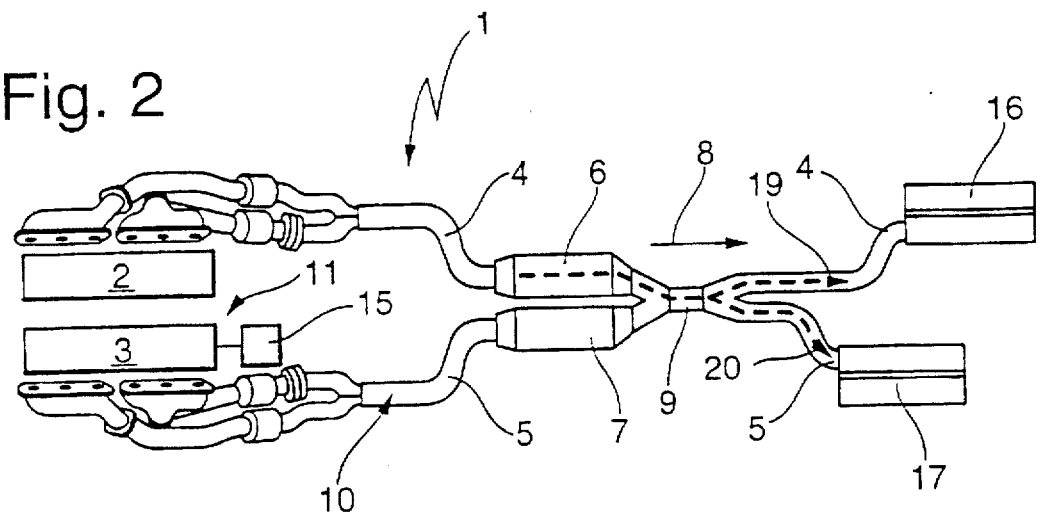
FIG. 2 shows the internal combustion engine in accordance with FIG. 1 in the part-load range without actuation of the vacuum device.
Figure 3:
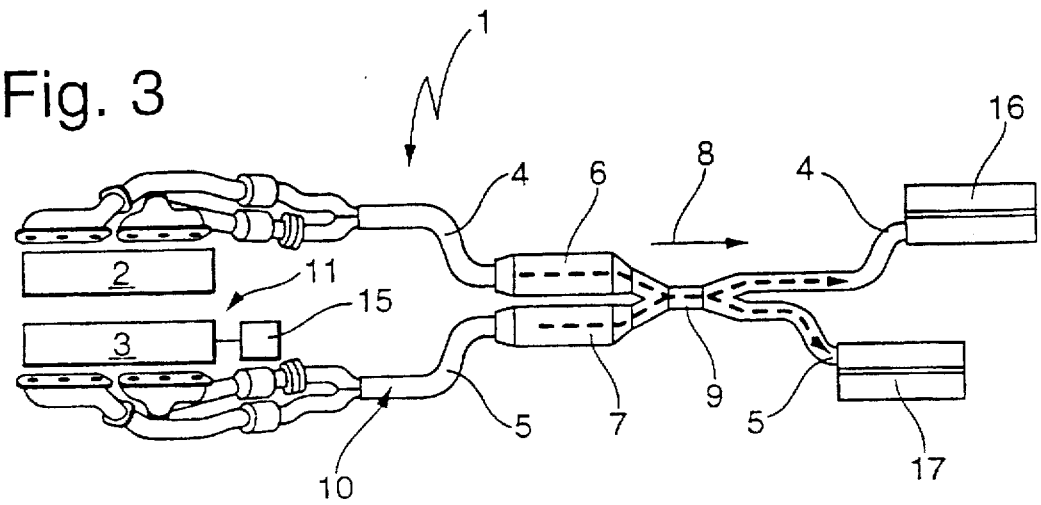
FIG. 3 shows the internal combustion engine in accordance with FIG. 1 in the full-load range without actuation of the vacuum device.

The internal combustion engine 1 illustrated in FIGS. 1 to 3 has two cylinder groups 2, 3, which each contain the same number of cylinders. The internal combustion engine 1 can be a four-, six-, eight- or twelve-cylinder engine, for example. Each cylinder group 2, 3 has its own exhaust pipe 4, 5, in each of which there is arranged a catalytic converter 6, 7. Following the catalytic converters 6, 7 in the direction of exhaust gas flow 8, the exhaust pipes 4, 5 are joined by a common pipe section 9 which, further downstream, is again divided into two separately routed exhaust pipes. Further downstream, exhaust silencers 16, 17 may furthermore be arranged in the exhaust pipes 4, 5, through which the exhaust gases are discharged into the atmosphere.

The cylinder group 2 is designed as a continuously operating cylinder group. Cylinder group 3 can be shut down, that is, made inoperative during part-load operation of the internal combustion engine 1 to provide for a reduction in fuel consumption and pollutant emissions. In part-load operation in accordance with FIG. 1, only the cylinder group 2 is activated, and its exhaust gases flow through the exhaust pipe 4 and the catalytic converter 6. As a result, the catalytic converter 6 reaches its operating temperature within a very short time providing for the catalytic conversion of the pollutants in the exhaust gas.

In order to insure that the exhaust gases passed through the exhaust pipe 5 can be purified without delay in the catalytic converter 7 when the cylinder group 3 is brought into operation upon transition from part-load operation to full-load operation, the catalytic converter 7 must already have reached its operating temperature. The second catalytic converter 7 is heated to operating temperature by diverting at least some of the hot exhaust gases from the first exhaust pipe 4 back into the second exhaust pipe 5 via the common tube section 9, in accordance with the arrow direction 18. In this process, the hot exhaust gases from the cylinder group 2 first pass through the first catalytic converter 6 and are then diverted to the second catalytic converter 7, which is thereby heated to its operating temperature. In addition, further catalytic cleaning of the exhaust gases takes place once the temperature required for the catalytic action is reached.

In order to insure that at least some of the exhaust gases pass in arrow direction 18 through the second catalytic converter 7 of the inoperative cylinder group 3, the shutdown cylinder group 3 is assigned a vacuum device 11 by which a vacuum is generated in the conduit section 10 of exhaust pipe 5 between the cylinder group 3 and the catalytic converter 7, which brings about a return flow of exhaust gas in the arrow direction 18. The vacuum device 11 is formed by the pistons of the inoperative cylinder group 3, the combustion chambers of which are placed in communication with the exhaust pipe 5. The motion of the pistons generates a periodic vacuum which brings about cyclic inflow of the exhaust gas from the continuously-operating cylinder group 2 into the second catalytic converter 7 of the inoperative cylinder group 3. Communication between the combustion chambers of the cylinders of the inoperative cylinder group 3 with the exhaust pipe 5 of this cylinder group is expediently established by moving the exhaust valves of the inoperative cylinder group 3 into the open position. It is advantageous if the inlet valves are at the same time kept closed to prevent cool fresh air from being passed through the cylinders and cooling the second catalytic converter 7.

Also provided is a shut-down device 15 by means of which the vacuum device 11 is shut down when a predetermined temperature is reached, specifically when the operating temperature of the catalytic converter 7 is reached. In this case, the exhaust gas from the continuously operating cylinder group 2 is discharged without being recirculated.

As shown in FIG. 2, the internal combustion engine 1 is still in the part-load range, in which the second cylinder group 3 has not yet been brought into operation. The exhaust gases of the continuously operating cylinder group 2 are passed through the exhaust pipe 4 and the catalytic converter 6 and are discharged in the arrow direction 8. The catalytic converter 7 of the inoperative cylinder group 3 has already reached its operating temperature; the vacuum device 11 has been shut down by the device 15, so that no vacuum is generated in the exhaust pipe 5 of the cylinder group 3 and the exhaust gases of the operating cylinder group 2 are discharged without flowing through the catalytic converter 7.

Downstream of the common pipe section 9, the exhaust gas stream is divided into two part-streams 19, 20, which flow through the end sections of the exhaust pipes 4 and 5. Optimum silencing can thereby be achieved.

As shown in FIG. 3, the internal combustion engine is in the full-load range and both cylinder groups 2, 3 are operating. The exhaust gases of both cylinder groups 2, 3 are passed through the associated exhaust pipes 4, 5 and the respective catalytic converters 6, 7. The vacuum device 11 is shut down and the exhaust gases of both cylinder groups are discharged in the flow direction 8.

Figure 4:
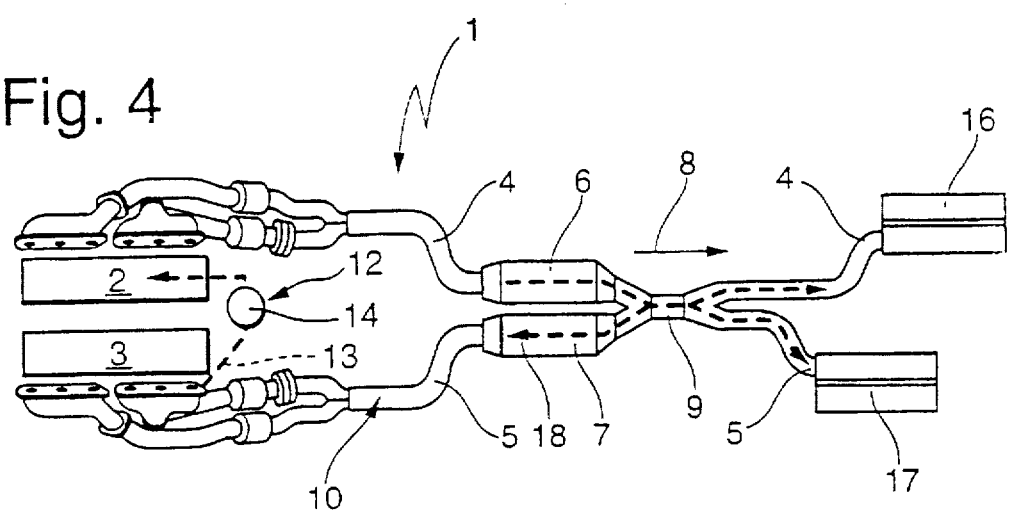
FIG. 4 shows a piston-type internal combustion engine according to the invention, in a different embodiment, in the partload range, with actuation of the vacuum device.
Figure 5:
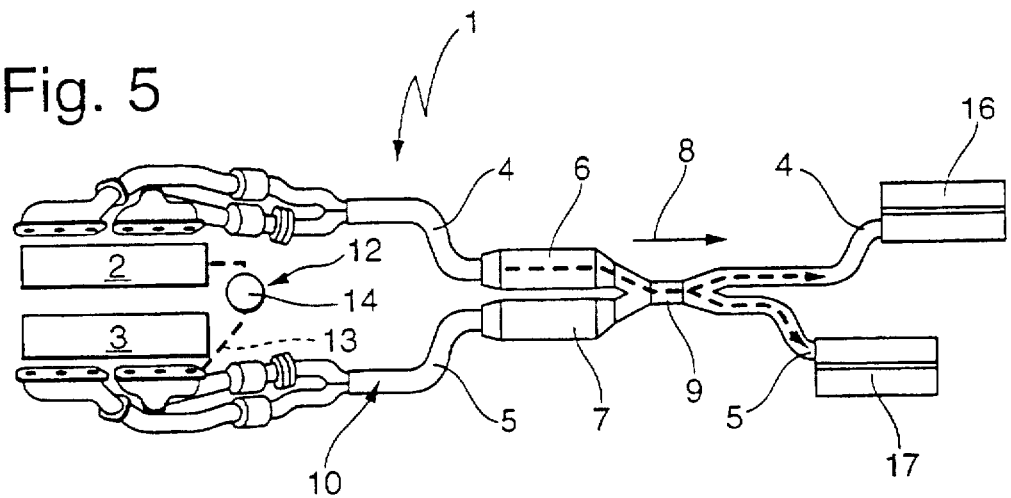
FIG. 5 shows the internal combustion engine in accordance with FIG. 1 in the part-load range without a vacuum being applied to the exhaust pipe of the inoperative cylinder group.
Figure 6:
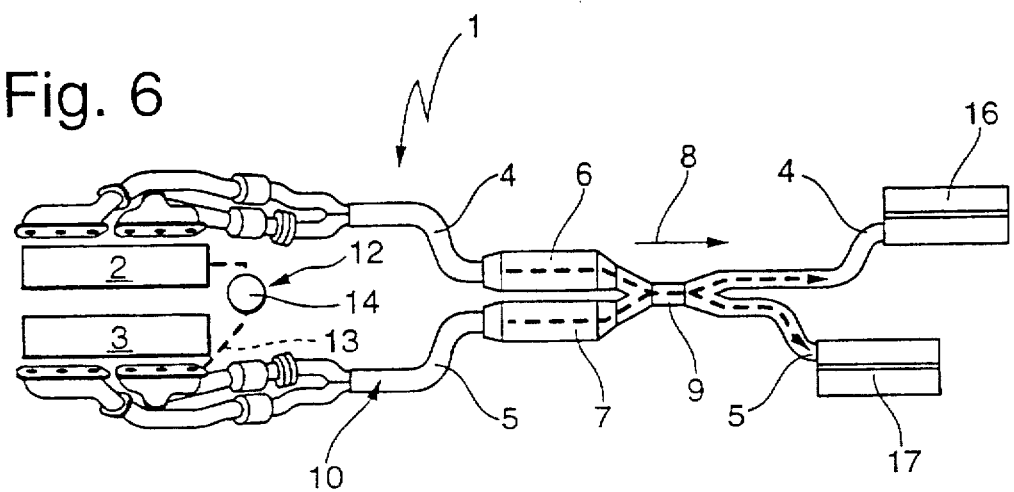
FIG. 6 shows the internal combustion engine in accordance with FIG. 4 in the full-load operating range.

FIGS. 4, 5 and 6 show the internal combustion engine 1 with a vacuum device 12 in a different embodiment. FIG. 4 shows the engine in a part-load range with the vacuum device 12 switched on. Thus, a vacuum is generated between the inoperative cylinder group 3 and the catalytic converter 7 in the conduit section 10 of the exhaust pipe 5, whereby some of the exhaust-gas stream produced by the operating cylinder group 2 is pulled back in the direction of arrow 18 through catalytic converter from the pipe section 9. The vacuum device 12 comprises an exhaust recirculation conduit 13 which connects the exhaust pipe 5 of the inoperative cylinder group 3 to the intake pipe of the operating cylinder group 2. In the exhaust recirculation conduit 13 there is a shutoff valve 14 which shuts off the recirculation conduit 13 as soon as the catalytic converter 7 has reached its operating temperature. The shut-off valve 14 represents the shut-down device for the vacuum device 12. The shut-down device can be controlled as a function of the temperature of the catalytic converter in the exhaust pipe 5, so that the vacuum device is shut down when a sufficient temperature level, for example an operating temperature of about 350° C., is reached.

By virtue of the connection created, via the recirculation conduit 13, between the exhaust pipe 5 of the inoperative cylinder group 3 and the intake pipe of the operating cylinder group 2, a vacuum is produced in the conduit section 10 of exhaust pipe 5, providing for a recirculation flow of at least some of the exhaust gas of the continuously operating cylinder group 2 back through the catalytic converter 7.

In FIG. 5, the internal combustion engine 1 is still in the part-load range, but the catalytic converter 7 has already reached its operating temperature and the vacuum device 12 has been shut down by the shut-off valve 14, thereby interrupting the communication between the exhaust pipe 5 and the intake pipe of the first cylinder group 2.

FIG. 6 shows the internal combustion engine in the full-load range, in which both cylinder groups 2, 3 are operating and the exhaust gases are discharged via the exhaust pipes 4, 5 and the catalytic converters 6, 7. In the full-load range, the shut-off valve 14 is in the closed position and the vacuum device 12 is shut down.

What is claimed is:

1. A multi-cylinder piston-type internal combustion engine with at least two cylinder groups, each having an exhaust pipe including at least one catalytic converter, one of said cylinder groups being capable of being shut down such that it is inoperative during part-load operation of said internal combustion engine, said exhaust pipes being joined by a common pipe section downstream of said catalytic converters, and vacuum generating means for subjecting the exhaust pipe of said inoperative cylinder group upstream of its catalytic converter during part-load operation to a vacuum for pulling exhaust gas from said common pipe section into the catalytic converter of said inoperative cylinder group.

2. An engine according to claim 1, wherein a shut-down device is provided by means of which said vacuum generating means can be disabled when said catalytic converter of said first cylinder group has reached a predetermined temperature.

3. An engine according to claim 1, wherein said vacuum generating means is formed by the cylinders and pistons of said inoperative cylinder group.

4. An engine according to claim 3, wherein each cylinder has intake and exhaust valves and the exhaust valves of the cylinders of the inoperative cylinder group are moved into an open position and the intake valves are moved into a closed position.

5. An engine according to claim 1, wherein said vacuum generating means comprises an exhaust recirculation conduit which connects the exhaust pipe of the inoperative cylinder group to an intake pipe of the operating cylinder group.

6. An engine according to claim 5, wherein the shut-down device is a shut-off valve, which is arranged in said exhaust gas recirculation conduit.

* * * * *